United States Patent
Smith et al.

(10) Patent No.: US 7,590,100 B2
(45) Date of Patent: Sep. 15, 2009

(54) METHOD FOR PACKET POLLING IN A WLAN

(75) Inventors: Brian K. Smith, Wellington, FL (US); Satish Ramprasad, Boynton Beach, FL (US); Srinath Subramanian, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 398 days.

(21) Appl. No.: 11/318,322

(22) Filed: Dec. 23, 2005

(65) Prior Publication Data
US 2007/0147330 A1 Jun. 28, 2007

(51) Int. Cl.
H04J 3/16 (2006.01)
(52) U.S. Cl. .................. 370/346; 370/329; 370/341; 370/344; 370/392
(58) Field of Classification Search .......... 370/346–354
See application file for complete search history.

(56) References Cited

U.S. PATENT DOCUMENTS

2004/0165563 A1 8/2004 Hsu et al.
2005/0036466 A1 2/2005 Malik et al.
2005/0089009 A1 4/2005 Raleigh et al.
2005/0105503 A1 5/2005 Cayla et al.
2005/0152373 A1 7/2005 Ali
2005/0181840 A1 8/2005 Bangingwar et al.
2005/0207400 A1* 9/2005 Shinohara .................. 370/352

* cited by examiner

Primary Examiner—Alexander Eisen
Assistant Examiner—Dai A Phuong
(74) Attorney, Agent, or Firm—Akerman Senterfitt; Pablo Meles

(57) ABSTRACT

A method (500) is provided for dynamic packet polling during a power save mode. The method can include polling (504) an access point (104) for packets at a first rate on at least one access category, determining (506) a polling time-out as a function of a packet priority, and possibly changing the rate to a second rate in view of a second packet priority. The polling time-out can correspond to a duration interval of the polling for increasing an efficiency of the power save mode. The method can include establishing a poll timeout and an overall poll timeout as a function of each access category. The function can include mapping a packet priority to a response time for setting a timeout. In one aspect, the polling can be combined into a single polling stream for multiple access categories.

13 Claims, 6 Drawing Sheets

| | 201 | 202 | 203 | 204 | 205 | 206 |
|---|---|---|---|---|---|---|
| | [802.1d]Tag | AC Mapping per 802.11e | Response Time Index, i | psTimerArray[i] (ms) | overallPollTimeout[AC] | pollTimeout[AC] |
| | 1,2 | AC_BK | 0 | 0 | 300 | 150 |
| | 0,3 | AC_BE | 1 | 150 | 200 | 100 |
| | 4,5 | AC_VI | 2 | 75 | 150 | 50 |
| | 6,7 | AC_VO | 3 | 25 | 100 | 25 |

METHOD FOR PACKET POLLING IN A WLAN

FIELD OF THE INVENTION

The embodiments herein relate generally to methods and systems for wireless communications, and more particularly wireless networking.

Description of the Related Art

Wireless Local Access Networks (WLANs) provide wireless access to a communication network within a local geographical area, such as a building or facility. WLANs can also be used to complement loading on a cellular system, so as to increase capacity. WLANs are typically composed of a cluster of Access Points (APs) also known as base stations. Additionally, users can obtain access to WLANs to acquire services using a WLAN station. A WLAN station discovers a WLAN through active or passive scanning of the WLAN channels for the presence of APs. To perform a passive scan, a WLAN station listens for Beacon frame transmissions from the APs on each WLAN channel. Beacon frames may contain a global or direct Service Set Identifier (SSID) which uniquely identifies a WLAN. Beacon frames are transmitted at the Beacon Interval which is a static, configurable parameter specifying the time interval between beacon frame transmissions from an AP. To perform an active scan, a wireless station transmits a Probe Request on each WLAN channel. The Probe Request may contain a global or direct SSID. The AP transmits a Probe Response with direct SSID to the WLAN station. Upon discovery of a WLAN, the WLAN stations can request a service by communicating with the AP for receiving and transmitting packets of data.

A WLAN station can operate in an Active or Power Save (PS) Mode on a WLAN. When in Active Mode, the WLAN station continuously monitors the WLAN channel for broadcast, multicast and unicast frames. In PS Mode, the WLAN station monitors Beacon frames only for buffered traffic indications from the AP.

A WLAN station in Active Mode is able to receive and transmit frames on the WLAN channel with low latency. Since the WLAN station is continuously monitoring the WLAN channel, the rate of power consumption is high which reduces the WLAN station's battery life.

A WLAN station in PS Mode monitors Beacon frames for indications concerning data buffered at the AP. The WLAN station can monitor Beacon transmissions from an AP at the Beacon Interval or at a Delivery Traffic Indication Message (DTIM) Beacon Interval. To maximize a WLAN station's battery life, the WLAN station is generally configured to wake up to receive DTIM Beacons only. The buffered data can contain packets for providing the requested service, such as Internet access. After the WLAN station transmits a request type packet (i.e. Dynamic Host Configuration Protocol (DHCP) Request) to the AP, the WLAN station can generally wait for a portion of the DTIM Beacon Interval for the response type packet (i.e. DHCP Response) from the AP. The regular schedule for receiving packets from the network based on the regular DTIM Beacon Interval can introduce latency in the service and degrade the quality of the WLAN station user's experience.

With recent developments in quality of service (QoS) standards, the AP can now provide differentiated control of access to the medium to handle data transfers with varying QoS requirements. The AP defines multiple Access Categories (ACs) for various traffic types such as voice, video and data. Each AC is configured separately for delivering traffic to a WLAN station that is operating in PS Mode. An AC may be configured to deliver frames via Automatic Power Save Delivery (APSD), Beacon frames or a combination of APSD and Beacon frames.

SUMMARY

The embodiments of the invention concern a method and system for operating a WLAN station in power save mode. The method includes monitoring a beacon transmission and adjusting the duration of an active mode period. The step of adjusting can further include mapping a packet priority to a response time and extending an active mode period in view of the response time. The response time can be determined by a Layer 2 Packet Markings, a Layer 3 Packet Markings (DSCP), or a Layer 7 Application Information. The response time can also be learned from traffic patterns and trace routing. For example, learning can include determining the time delay in receiving a packet from a server, or counting the number of hops a packet travels within a network.

In accordance with another aspect of the present invention, a method for dynamic packet polling during a power save mode can include polling an access point for packets at a first rate on at least one access category, determining a polling time-out as a function of a first packet priority, and changing the first rate to a second rate in view of a second packet priority if the second packet priority is higher than the first packet priority. The method can include establishing a polling timeout and an overall poll timeout as a function of each access category. The function can include mapping a packet priority to a response time for setting a timeout. In one aspect, the polling can be combined into a single polling stream for multiple access categories.

The step of polling can further include starting a poll timer for at least one access category, transmitting at least one packet to an access point when the poll timer expires, receiving at least one packet in response to the transmitting, and stopping the transmitting when an overall poll timer expires. Each access category can have a poll timer and an overall poll timer. The poll time-out can be set to a poll time-out of the access category with the highest priority packet. The method can include establishing an overall time-out as a function of each access category. The overall poll time-out can be set to the access category (AC) with the highest poll timeout.

The method step of determining a polling time-out can further include expiring a poll time-out, upon said expiring, transmitting a power-save poll frame to an access point, upon receiving a packet, identifying an access category with highest priority, and setting the poll time-out in view of the highest priority packet, under conditions where the overall poll timeout has not expired.

The step of changing the rate can further include determining if a packet has been transmitted or received on an access category, updating a packet time array for the access category, determining an overall poll time-out based on an access category with the longest time-out for starting an overall polltimer, and determining a poll time-out based on an access category with the highest priority for starting a poll-timer. Updating a packet time array can include identifying a time stamp.

The step of determining the overall poll time-out can further include determining if packet polling is enabled, comparing the overall poll time-out to a remaining time in an overall poll timer, and setting the overall polling timer in view of the comparison. The overall polling timer can extend a time for transmitting power-save poll frames to an access point.

The step of determining the poll time-out can further include determining a highest priority packet on active access categories, setting a poll time-out corresponding to the highest priority packet, comparing the poll time-out to a remaining time in a poll timer, and setting the poll timer in view of the comparing. The poll timer can provide polling at a rate corresponding to the highest priority access category.

In accordance with another aspect of the present invention, there is provided a method for increasing a quality of service during a power save mode. The method can include monitoring a traffic rate, and switching to active mode when a preprogrammed traffic rate threshold is exceeded. In one arrangement, the traffic rate threshold can be a function of packet priorities within the traffic. The method can switch to active mode when the overhead required in PS-polling the AP exceeds the overhead in retrieving the packets in active mode. For example, switching to active mode can occur when a determination is made that retrieving packets in the active mode is more power efficient than retrieving packets in PS-polling mode.

BRIEF DESCRIPTION OF THE DRAWINGS

The features of the system, which are believed to be novel and nonobvious, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
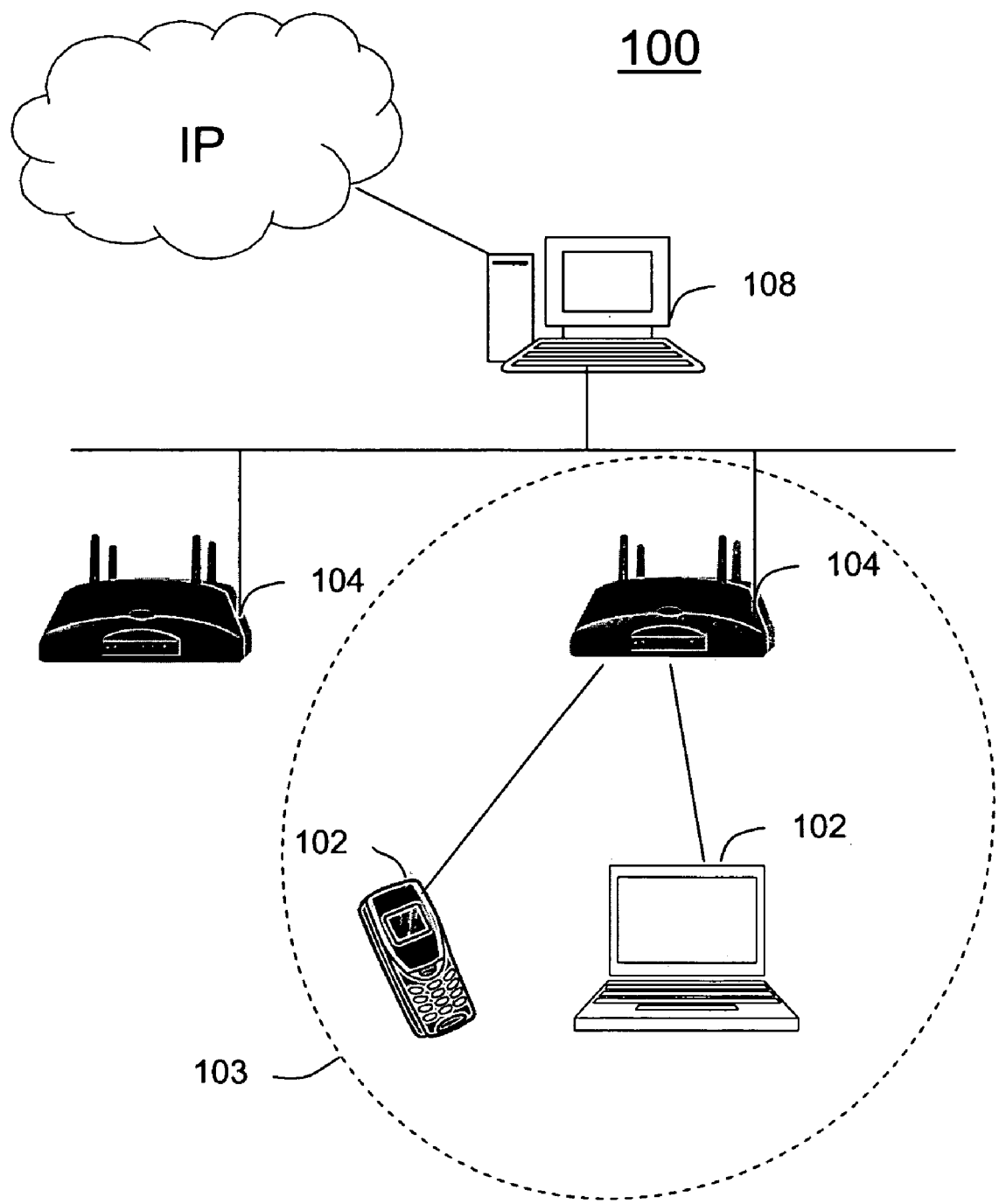
FIG. 1 illustrates a system for a wireless local area network in accordance with an embodiment of the inventive arrangements.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely. The term "processor" can be defined as any number of suitable components that carry out a pre-programmed or programmed set of instructions.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The embodiments of the invention concern a method and system for operating in power save mode. The method includes monitoring a beacon transmission from an access point, and adjusting the duration of an active mode period. The step of adjusting can further include mapping a packet priority to a response time, and extending an active mode period in view of the mapping.

Referring to FIG. 1, a wireless local area network (WLAN) 100 is shown. The network can include at least one WLAN station 102, at least one Access point (AP) 104, also known as a base station, which can route to a communication infrastructure such as an IP network. Communication within the network 100 can be established using a wireless, copper wire, and/or fiber optic connection using any suitable protocol (e.g., TCP/IP, HTTP, etc.). The network 100 can comprise any type of network, such as a Local Area Network (LAN), a Metropolitan Area Network (MAN), a Wide Area Network (WAN), a Wireless LAN (WLAN), or other network. WLAN stations within the coverage area can connect to the network 100 to acquire Internet and/or another LAN, MAN, LAN, or WLAN services. The WLAN station 102 can be a desktop computer, laptop computer, handheld computer, palmtop computer, mobile phone, push-to-talk mobile radio, text messaging device, two way pager, one-way pager, or any other wireless communications enabled device. The WLAN station 102 can be equipped with a transmitter and receiver for communicating with the AP 104 according to the appropriate wireless communication standard. In the preferred embodiment of the present invention, the wireless station 102 is equipped with an IEEE 802.11 compliant wireless medium access control (MAC) chipset for communicating with the AP 104.

The network 100 can cover a geographical region called an extended service area (ESA) within which members of an extended service set (ESS) may communicate. Generally, a WLAN includes several basic service sets (BSSs), each with an associated AP 104 which controls communication within its basic service area (BSA) 103. Multiple basic service areas 103 are interconnected to form an extended service area usually with a wired network typically using 802.3 LAN technologies. The APs 104 can communicate with an access router (AR) 108 to route traffic within and out of the network 100. Wireless stations 102 are allowed to roam within a defined basic service area 103 and across the overlapping basic service areas 103, with handoff of the device from one AP to the adjoining AP in accordance to known procedures. In typical WLAN implementations, the physical layer uses variety of technologies such as 802.11b or 802.11g WLAN technologies. The physical layer may use infrared, frequency hopping spread spectrum in the 2.4 GHz Band, or direct sequence spread spectrum in the 2.4 GHz Band. Additional functions such as packet fragmentation, re-transmission, and acknowledgements, can be carried out by the 802.11 MAC layer.

When associating to an AP 104, a WLAN station 102 sends an Association Request or Re-association Request frame to the AP 104, where the request includes a Listen Interval. The Listen Interval indicates how often the WLAN station 102 wakes up to listen to Beacon frames when operating in a Power Save (PS) Mode. The AP 104 can buffer frames for the WLAN station 102 according to the indicated Listen Interval. The Beacon frame includes the Beacon Interval and the DTIM Period. The Beacon Interval indicates the number of time units (TUs) between target beacon transmission times (TBTTs). The DTIM Period multiplied by the Beacon Interval indicates the DTIM Beacon Interval. The WLAN station 102 can monitor Beacon frame transmissions from the AP 104 at the Beacon Interval (i.e. 102.4 ms) or at the DTIM Beacon Interval (i.e. 3×102.4=307.2 ms). The WLAN station 102 can receive indications concerning buffered data available for the WLAN station 102 at the AP 104 when a Beacon or DTIM Beacon is received.

A WLAN station 102 may operate in Power Save (PS) or Active Mode. In Active Mode, the WLAN station 102 is continuously monitoring the channel for broadcast, multicast and unicast frames. The AP 104 does not buffer any frames for the WLAN station 102. The AP 104 immediately transmits frames to the WLAN station upon arrival at the AP 104. In PS Mode, the WLAN station 102 is responsible for monitoring Beacon or DTIM Beacon frames for a buffered traffic indication. If the Beacon or DTIM Beacon frame indicates buffered frames for the WLAN station 102, the WLAN station 102 transmits a Power-Save (PS) Poll to the AP 104, to which the AP 104 responds by sending a frame of data to the WLAN station 102. If the WLAN station 102 is not within the service area for receiving the Beacon or DTIM Beacon frame, the AP 104 will discard the packets upon expiration of the Listen Interval.

A WLAN station 102 is able to toggle between Active and PS Modes when communicating with AP 104. In PS Mode, the WLAN station 102 is able to minimize current drain, but at the cost of an increase in packet latency. During PS Mode, the WLAN station 102 is able to shut down various WLAN subsystems such as the radio frequency (RF) front end ICs to reduce current drain while waiting for a Beacon or DTIM Beacon frame. In Active Mode, the WLAN station 102 is able to minimize packet latency, but at a cost of a significant increase in current drain.

A WLAN station 102 such as a mobile phone must operate as much as possible in PS Mode to provide an acceptable battery life to the user. A WLAN station 102 must also provide satisfactory quality of service (QoS) when accessing the network. A trade-off between an acceptable battery life and satisfactory QoS can be achieved by combining the Active and PS modes of the WLAN station 102.

The degradation in the QoS can be seen in a typical "Request-Response" exchange between a server and a client that is operating in a WLAN. For example, a WLAN station 102 that is operating in PS Mode requests an Internet Protocol (IP) address from a Dynamic Host Configuration Protocol (DHCP) server by transmitting a DHCP Request to the AP 104. The AP 104 forwards the DHCP Request to the DHCP Server. The DHCP Server sends a DHCP Response back to the AP 104. The AP 104 indicates to the WLAN station 102 in the Beacon frame that a buffered frame is present. The duration of time that the WLAN station 102 has to wait for the response is dependent upon the response time of the DHCP Server and the distance from the next DTIM Beacon frame at the time which the request was transmitted. If the WLAN station 102 transmitted near the next DTIM Beacon, then the response is received quickly (i.e. 10 ms). If the WLAN station 102 transmitted immediately after a DTIM Beacon, then the response is received slowly (i.e. 300 ms). On average, the WLAN station 102 will wait half of the DTIM Beacon Interval for the response. The slow process of transmitting PS Poll frames to the AP 104 degrades the QoS at the WLAN station 102.

Embodiments herein provide an improvement in prolonging battery life during power save mode which involve a method of dynamic packet polling and adjusting active mode duration. The method can combine PS-polls from multiple access categories (ACs) into a single PS-polling stream. In a particular embodiment, the response times are a function of packet priority within the network traffic. For example, certain packet types can be associated with higher priority traffic such as voice, or with lower priority traffic such as data. Packet priorities are mapped to timeout values for adjusting the polling interval within the single PS-polling stream. In another arrangement, the response times can be a function of expected and desired response times from WLAN endpoints.

Figures 2, 3:
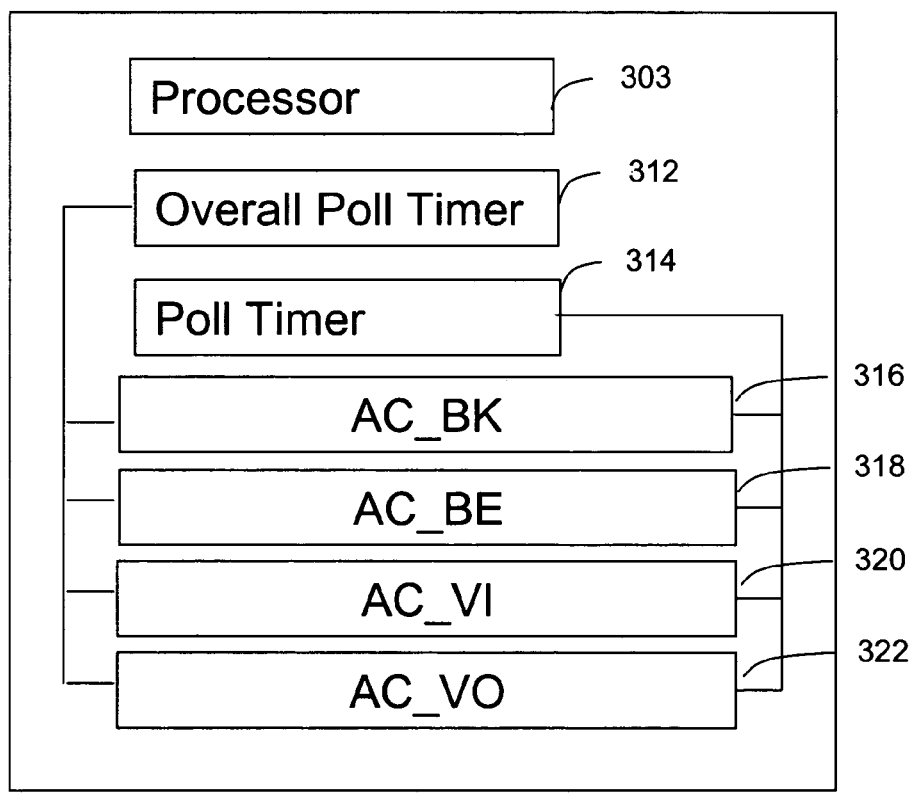
FIG. 2 depicts a mapping function in accordance with an embodiment of the inventive arrangements.
FIG. 3 depicts an overall poll timer and poll timer in accordance with an embodiment of the inventive arrangements.

Referring to FIG. 2, a mapping table 200 is shown in accordance with the embodiments of the invention. The mapping table 200 can include a an entry for 802.1d tags 201, AC Mapping per 802.11e 202, Response time index 203, psTimerArray 204, overallPollTimeout[AC] 205, and pollTimeout[AC] 206. For example, 802.1d Layer 2 tag mappings can include access channels 202 (ACs) for background (AC_BK), best effort (AC_BE), video (AC_VI), and voice (AC_VO). An AC is associated with a response time index 203 describing the priority of the traffic within the AC. The packet time array (i.e. psTimerArray 204) is used to determine if a particular AC is active and sets the active mode period. The overallPollTimout 205 and pollTimeout 206 set the polling window durations for the overall poll time out and the poll timeout, respectively. They are accessed during dynamic packet polling.

FIG. 3 depicts a system for adjusting active mode duration is shown. The system can include a processor 303 for monitoring beacon transmissions from at least one access point supporting a set of access channels (ACs). The processor can also adjust the duration of an active mode period, map a packet priority to a response time, and extend an active mode period in view of the mapping. The processor 303 can also provide dynamic polling for combining PS-Polls into a single stream. Accordingly, the system can include an overall poll timer 312 and poll timer 314 having access to a set of Access Channels (ACs) for establishing PS-poll times. The overall poll timer 312 determines the overall poll time for the set of ACs, and the poll timer 312 determines the poll time for the set of ACs. Referring to FIG. 2, the overall poll timer 312 references the overallPollTimout 205, and the poll timer 312 references the pollTimeout 206. For example, the Poll Timer 314 can be accessed for determining if a polling period exceeds a corresponding poll timeout period 206 on a particular AC. The Overall Poll Timer 312 can be accessed for determining if an overall polling period exceeds a corresponding timeout 205 period on a particular AC. The Poll Timer 312 and Overall Poll Timer 314 reference respective timeout periods for dynamically adjusting packet polling on an AP.

Figure 4:
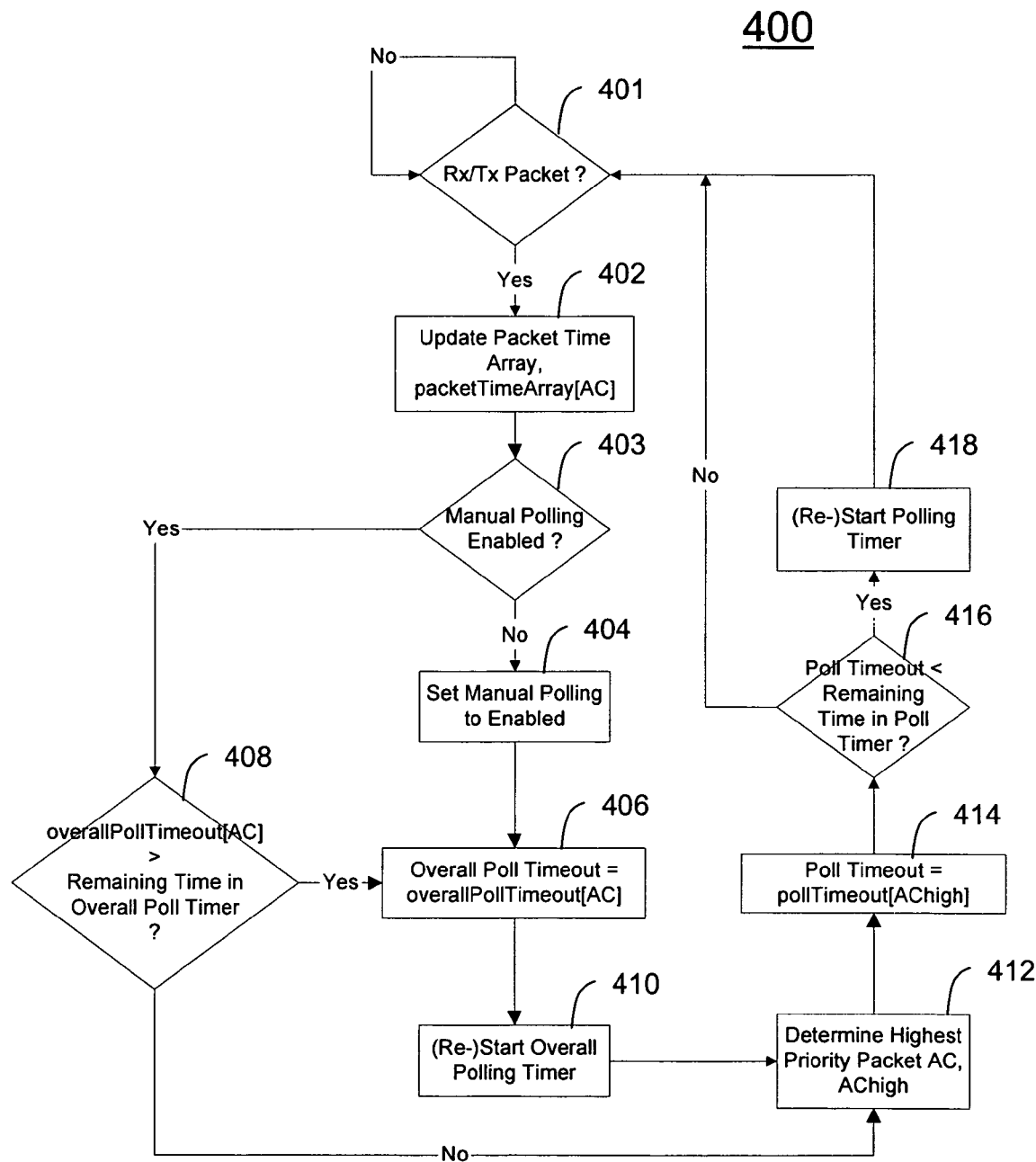
FIG. 4 is an operational flow diagram showing dynamic packet processing according to one embodiment of the present invention.

Referring to FIG. 4, an operational flow diagram for dynamic packet polling 400 according to one embodiment of the present invention is shown. The dynamic packet polling 400 can be employed within a WLAN station for extending the battery life. The dynamic packet polling 400 queries (e.g. polls) an access point (AP) for packets at a periodic rate for a programmable duration as a function of a packet priority. As packets with different priorities are received or transmitted, the dynamic packet polling 400 can combine the PS-Polls into a single stream. For example, the polling rate is changed as packets with different priorities are received from the AP. Notably, packet pollings on each AC are merged together into a single packet polling stream, thereby avoiding the need to assign individual PS-poll streams to each AC.

The dynamic packet polling occurs during a power save mode, and can include the steps of polling an access point for packets at a first rate on at least one access category, determining a polling time-out as a function of a packet priority, and changing the rate to a second rate in view of a second packet priority if the second packet priority is of a higher priority than the first packet. The polling can be combined into a single polling stream for multiple access categories.

At step 401, the method can determine if a packet has been transmitted or received on an access category. QoS Null and Null frames are not considered as receive frames by the dynamic packet polling algorithm, since these frames do not contain data. At step 402, a packet time array is updated if the device transmits or receives a packet on an access category. The updated packet time array stores a timestamp for the particular access category. The packet time array is used to determine if a particular AC is active. If the packetTimeArray [AC] +overallPollTimeout[AC] is less than the timeNow (i.e. the current timestamp), then the AC is not active. For example, referring to FIG. 3, if an AC_BK is receiving or transmitting a packet, the poll timer 314 can be accessed to identify a time stamp for evaluating the condition. Notably, each AC 316-320 has reference to the poll timer 314, for determining the last time a packet was received.

At step 403, a determination is made as to whether packet polling is enabled. Accordingly, packet polling is enabled on an AC for which a packet is received or transmitted. At step 404, packet polling is enabled for an AC that was previously disabled. Polling can include starting a poll timer for at least one AC, transmitting at least one packet to an AP when the poll timer expires, receiving at least one packet in response to the transmitting, and stopping the transmitting when an overall poll timer expires.

At step 408, a conditional test is made as to whether the overall poll timeout for the particular AC is greater than the amount of time remaining in the overall poll timer. Notably, each AC has access to the poll timer 314 to identify a timeout period, and an overall poll timer 312 to identify an overall timeout period. For example, referring to FIG. 2, each AC 316-320 will have reference to a overallPollTimeout 205 or a pollTimeout 206 that defines the duration of a polling interval. The Overall Poll Timer sets overall poll timeout period in view of the longest timeout period of the respective AC channels. The test at step 408 determines which of the polling timeouts is longest in order to establish the duration of overall polling period. At step 406, the overall poll timeout is set to the timeout period of the AC with the longest overall poll timeout. Step 406 establishes the number of polls within an overall polling period. At step 410, the poll timer is started, or restarted depending on whether or not the overall poll timer has already been started.

At step 412, the highest priority packet AC is determined from the active ACs. The AC with the highest priority is selected as representing the Poll Timer. At step 414, the poll timeout is set to the poll timeout of the AC with the highest priority packet. At step 416, a determination is made as to whether the poll timeout is less than the remaining time in the poll timer. If the poll timeout is less than the remaining time in the poll timer, the poll timer is started or restarted depending on whether or not the poll timer has already been started. If the poll timeout is not less than the remaining time in the poll timer, the poll timer is not started or restarted.

For example, if the current poll is based on a lower priority 100 ms timeout and a higher priority packet arrives after 10 ms having an associated timeout of 25 ms, the poll timer, at step 418, is restarted with a 25 ms timeout to poll at the higher rate. For example, the logic to determine the highest priority packet AC is shown in pseudo code:

```
Set AChigh to NONE
FOR each AC (0, 1, 2, & 3) starting with the lowest priority (i.e.
AC_BK = 0)
    IF ((timeNow – packetTimeArray[AC]) < overallPollTimeout[AC])
    Set AChigh to AC
    ENDIF
END FOR LOOP
```

Figure 5:
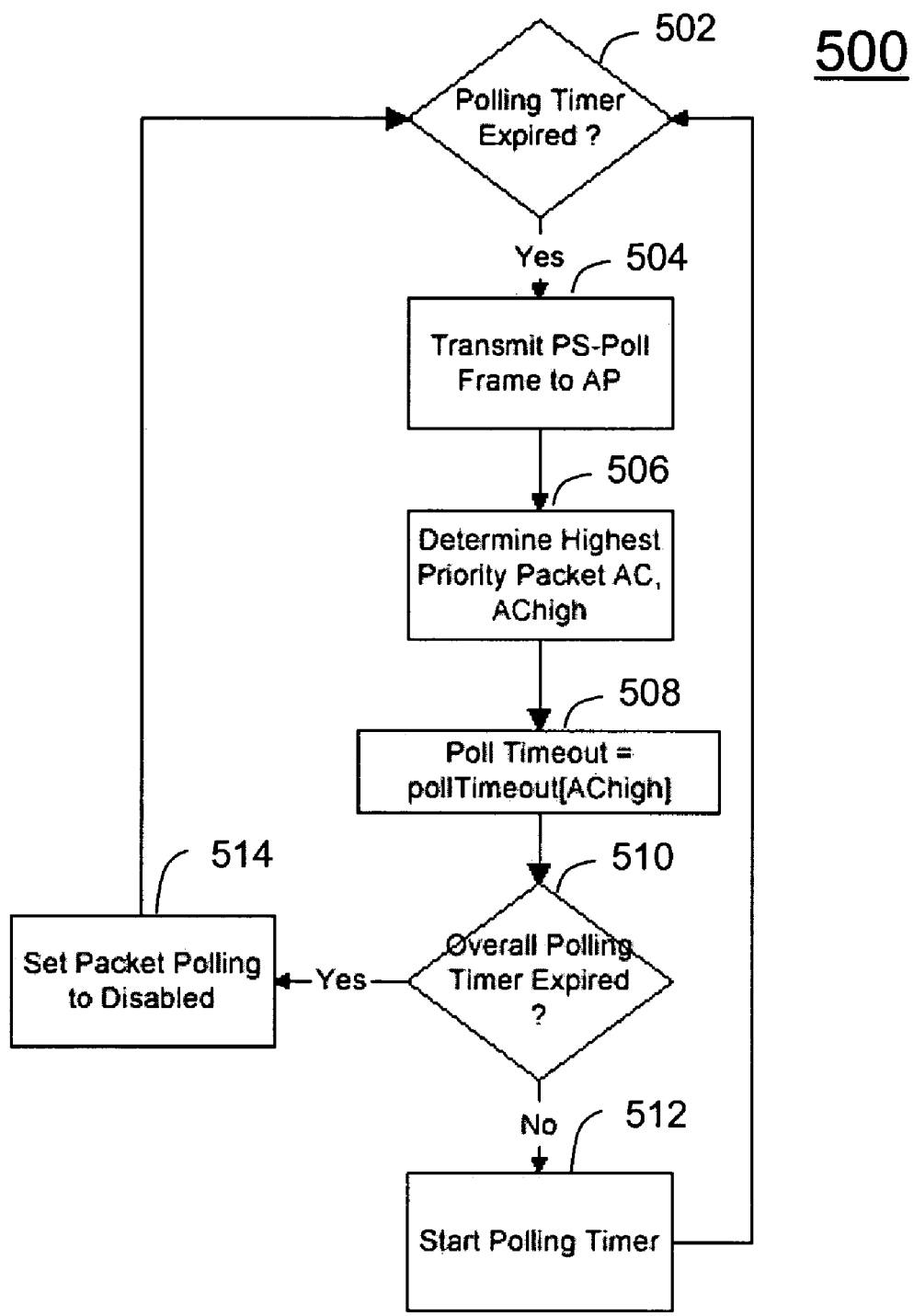
FIG. 5 is an operational flow diagram showing the handling of packet polling timeouts according to one embodiment of the present invention

Referring to FIG. 5, a method 500 is shown for handling a poll timeout. The method 500 can include expiring a poll time-out, transmitting a PS Poll frame to an access point, identifying an access category with highest priority, and setting the poll time-out in view of the highest priority packet. For example, at step 502, a polling timer expiration can be checked. At step 504, PS-polls can be transmitted to the AP. At step 506, the highest priority packet across the active ACs can be determined. At step 508, the poll timeout can be set to the poll timeout of the AC with the highest priority. At step 510, a determination as to whether the overall poll timer has expired can be checked. At step 512, the polling timer can be started. At step 514, packet polling can be disabled.

Notably, ACs that are configured to be delivery and trigger enabled are polled using QoS Data and/or QoS Null frames via APSD. ACs that are not configured to be delivery and trigger enabled are polled using PS Poll frames. For example, an AC_VO that is configured to be delivery and trigger enabled would be polled by the uplink voice packets (i.e. QoS Data frames with voice payload). Other delivery and trigger enabled ACs could be polled at various rates including a back-off mechanism. In the following examples, AC_BK and AC_VI are not configured to be delivery and trigger enabled. Note that for each packet that is received or transmitted, the Overall Poll Timer is re-started.

Figure 6:
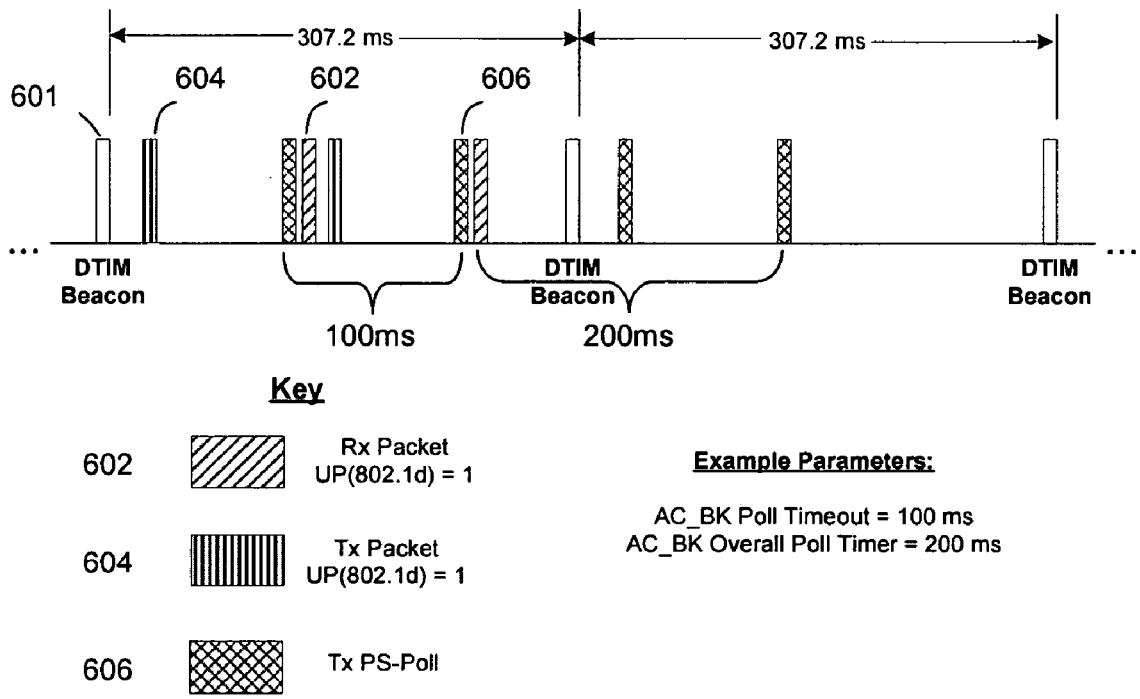
FIG. 6 illustrates a packet polling example for a low priority packet according to one embodiment of the present invention.

Referring to FIG. 6, an example of dynamic packet polling for a low priority packet is shown. In this example, the device is transmitting only a low priority packet to the network. For example, referring to FIG. 2, the low priority packet corresponds to AC_BK with 802.1d tag 1 having a response time index of 0 mapped to a time out value of 100 ms and an overall poll time out value of 200 ms. The dynamic packet polling 400 starts the Poll Timer (i.e. 100 ms) 314 and the Overall Poll Timer (i.e. 200 ms) 312 upon a first packet being transmitted 604 to the AP 104. For example, a user can initiate an Internet browsing function on the WLAN station 102 which results in the WLAN station 102 transmitting the first packet 604. Notably, the dynamic packet polling 400 begins after the transmission of the first packet 604. The Poll Timer 314 expires and the WLAN station 102 transmits a PS-Poll 606 to the AP 104. The AP 104 responds by transmitting a buffered frame 602 to the WLAN station 102. The WLAN station 102 in turn transmits a second packet 604 to the AP 104. The Poll Timer 314 expires and the WLAN station 102 transmits a PS-Poll 606 to the AP 104. The AP 104 responds by transmitting a buffered frame 602 to the WLAN station 102. Notably, the PS-Poll 606 transmissions to the AP 104 stop when the Overall Poll Timer expires. The PS-Poll 606 transmissions are slotted in 100 ms intervals, and the PS-Poll 606 transmissions stop 200 ms after the last received buffered frame 602, which corresponds to the expiration of the overall poll timer 316.

Figure 7:
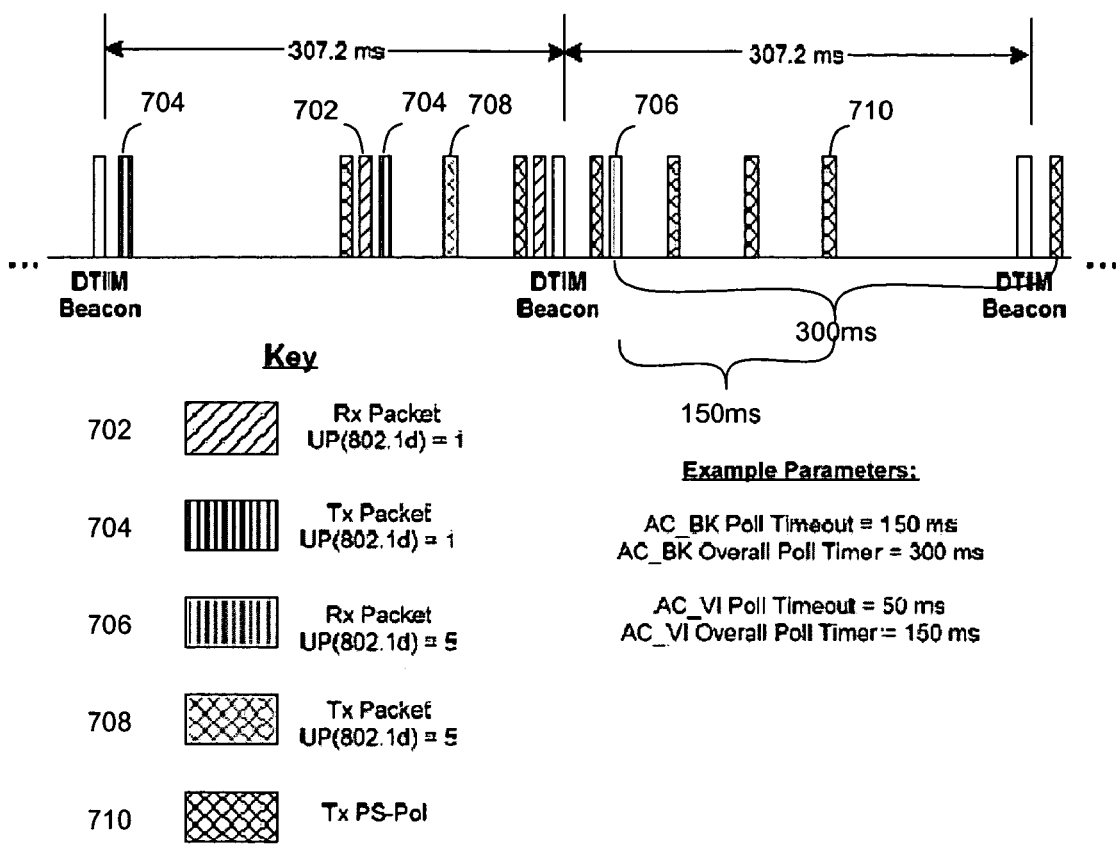
FIG. 7 illustrates a packet polling example for a high priority packet and low priority packet according to one embodiment of the present invention.

Referring to FIG. 7, an example of dynamic packet polling for a low priority packet and a high priority packet is shown. The figure illustrates the process of dynamically adjusting the duration of the polling strategy as a function of the packet priorities. Notably, the packet polling is extended based on the expiration of an Overall Poll Timer in combination with a Poll Timer. Recall, from FIG. 3, the Overall Poll Timer 314 and Poll Timer 312 are set based on the response time indexes established by a mapping such as that seen in FIGS. 2 and 4. In a given embodiment, the mapping of polling interval periods can be based on packet priority. However, other response time mappings such as those described by Layer 2, Layer 3, and Layer 7 criteria are contemplated within the scope of the claims herein. Referring back to FIG. 7, a first low priority packet 704 is transmitted to the AP 104 which starts the dynamic packet polling 400. Upon a first low priority packet 704 being transmitted to the AP, the Poll Timer (i.e. 150 ms) and the Overall Poll Timer (300 ms) start. Upon expiration of the Poll Timer 314, the WLAN station 102 transmits a first PS-Poll 710 to the AP 104. The AP 104 responds by transmitting a first buffered low priority frame 702 back to the WLAN station 102. The WLAN station 102 in turn transmits a second low priority packet 704 to the AP 104. The WLAN station 102 also transmits a first high priority packet 708 to the AP 104. Accordingly, due to a high priority packet being sent, the Poll Timer is re-started with a smaller timeout (i.e. 50 ms).

Notably, the smaller time out period results in a faster PS-polling rate to the AP 104 for receiving packets. For instance, the high priority packet is associated with a service that requires faster packet delivery to maintain a quality of service. Following with the example, the Poll Timer 314 expires and the WLAN station 102 transmits a second PS-Poll 710 to the AP. The Poll Timer 314 is restarted. The AP 104 responds by transmitting a second buffered low priority frame 702 to the device. The Poll Timer 314 again expires and the WLAN station 102 transmits a third PS-Poll 710 to the AP 104. The AP 104 responds by transmitting a first buffered high priority frame 706 to the WLAN station 102. For example, the high priority packet 706 can be a packet from AC_VI. The WLAN station 102 continues transmitting a third, fourth, and fifth PS-Poll at intervals set by the Poll Timer 314 (50 ms as a result of the high priority packet 708), until expiration of the Overall Poll Timer 312, which corresponds to approximately 150 ms.

In another aspect, the WLAN station 102 can exit PS-mode and enter active mode to retrieve the packets at a higher rate. For example, the WLAN station 102 can switch out of PS-mode to active mode when there are too many packets at the AP to be retrieved using a PS-polling method. Accordingly, the processing overhead required for PS-polling can exceed the processing overhead for retrieving the packets in active mode. It may be more efficient to switch out of PS-mode into active mode for conserving battery power. For example, switching to active mode can occur when a determination is made that retrieving packets in the active mode is more power efficient than retrieving packets in PS-polling mode.

Consequently, in another arrangement, the duration of active mode periods can be dynamically adjusted as a function of the expected and desired response times from the WLAN endpoints. For example, the response time can be learned from traffic patterns of different endpoints (e.g., WLAN stations) such as the amount of time it takes a server to respond to a request. The response times can also be learned from IP tools such as trace routing to count the number of hops a packet travels in a network to reach a destination.

The response time can also be a function of Layer 2 Packet Markings (802.1d), Layer 3 Packet Markings (DSCP), or Layer 7 Application Information (i.e. browser session started, call setup in progress, dispatch call setup in progress, etc). For example, referring to FIG. 2, a mapping between the Layer 2 802.1d tag 201 and the response time index 203 is shown. The duration of active mode periods are adjusted in accordance with the timeout value 204 associated with the response time index 203. As packets are received or transmitted on each AC, the duration of the Active Mode period is extended according to the expected response time. Note, the mapping illustrated in FIG. 2 is merely an example where one type or category of service may be given preference over another. Depending on a user's preference, such mapping can be altered accordingly to provide a higher Quality of Service or battery life to one particular service or another.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

What is claimed is:

1. A method for dynamic packet polling during a power save mode, comprising the steps of:
    polling an access point for packets at a first rate on at least one access category;
    determining a polling time-out as a function of a first packet priority; and
    changing said first rate to a second rate in view of a second packet priority if said second packet priority is higher than said first packet priority, wherein changing said rate further comprises the steps of:
        determining if a packet has been transmitted or received on an access category;
        updating a packet time array for said access category;
        determining an overall poll time-out based on an access category with the longest time-out for starting an overall poll-timer; and determining a poll time-out based on an access category with highest priority for starting a poll-timer.

2. The method of claim 1, wherein said polling is combined into a single polling stream for multiple access categories.

3. The method of claim 1, further comprising establishing an overall time-out as a function of each access category.

4. The method of claim 1, wherein said polling further comprises the steps of:

starting a poll timer for at least one access category;
transmitting at least one packet to an access point when said poll timer expires;
receiving at least one packet in response to said transmitting; and
stopping said transmitting when an overall poll timer expires,
wherein each access category has a poll timer and an overall poll timer.

5. The method of claim 4, wherein said polling time-out is set to a poll time-out of the access category with the highest priority packet.

6. The method of claim 4, wherein an overall poll time-out is set to an access category with the longest poll timeout.

7. The method of claim 4, wherein said transmitting corresponds to a user action.

8. The method of claim 1, wherein updating the packet time array includes the step of identifying a time stamp.

9. The method of claim 1, wherein determining the overall poll time-out further comprises the steps of: determining if a packet polling is enabled; comparing said overall poll time-out to a remaining time in an overall poll timer; and setting said overall poll timer in view of said comparing.

10. The method of claim 9, wherein setting said overall polling timer extends a time for transmitting power-save poll frames to an access point.

11. The method of claim 1, wherein determining the poll time-out further comprises the steps of: determining a highest priority packet on active access categories; setting a poll time-out corresponding to said highest priority packet; comparing said poll time-out to a remaining time in a poll timer; and setting said poll timer in view of said comparing.

12. The method of claim 11, wherein setting said poll timer provides polling at a rate corresponding to the highest priority access category.

13. A method for dynamic packet rolling during a power save mode, comprising the steps of:

rolling an access point for packets at a first rate on at least one access category;
determining a rolling time-out as a function of a first packet priority;
changing said first rate to a second rate in view of a second packet priority if said second packet priority is higher than said first packet priority; and
wherein determining the polling time-out further includes the steps of:
expiring a poll time-out;
upon said expiring, transmitting a power-save poll frame to an access point;
upon receiving a packet, identifying an access category with highest priority; and
setting said poll time-out in view of said highest priority packet, wherein said overall poll timeout has not expired.

* * * * *